US006983210B2

(12) United States Patent
Matsubayashi et al.

(10) Patent No.: US 6,983,210 B2
(45) Date of Patent: Jan. 3, 2006

(54) ENERGY MANAGEMENT SYSTEM, ENERGY MANAGEMENT METHOD, AND UNIT FOR PROVIDING INFORMATION ON ENERGY-SAVING RECOMMENDED EQUIPMENT

(75) Inventors: Shigeaki Matsubayashi, Ikoma (JP); Sachio Nagamitsu, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/870,005

(22) Filed: Jun. 18, 2004

(65) Prior Publication Data

US 2004/0260490 A1 Dec. 23, 2004

(30) Foreign Application Priority Data

Jun. 20, 2003 (JP) ............................ 2003-176460

(51) Int. Cl.
*G06F 19/00* (2006.01)
*G01R 15/00* (2006.01)

(52) U.S. Cl. .......................... 702/60; 702/57; 702/182

(58) Field of Classification Search ................. 702/57, 702/60, 62, 81, 182; 700/291, 295, 297
See application file for complete search history.

(56) References Cited

U.S. PATENT DOCUMENTS

2004/0220702 A1 * 11/2004 Matsubara et al. ......... 700/291

FOREIGN PATENT DOCUMENTS

| | | |
|---|---|---|
| JP | 9-53954 | 2/1997 |
| JP | 11-281122 | 10/1999 |
| JP | 2001-236024 | 8/2001 |

* cited by examiner

*Primary Examiner*—Bryan Bui
(74) *Attorney, Agent, or Firm*—Wenderoth, Lind & Ponack, L.L.P.

(57) ABSTRACT

An energy management system is provided which is capable of calculating, based on equipment information on electrical equipment which is used by a resident, a power consumption estimated when a replacement is made with energy-saving equipment, then comparing and displaying it and the power consumption of the electrical equipment owned by the resident, and thereby, allowing the resident to become aware of how the replacement helps save energy.

10 Claims, 9 Drawing Sheets

FIG. 3A

EQUIPMENT INFORMATION
(PRODUCT NUMBER, OPERATING STATE, ENVIRONMENTAL CONDITION, POWER CONSUMPTION)

| HOUSEHOLD ELECTRICAL APPLIANCE | EQUIPMENT INFORMATION | | | | | 2002.8.6 | | | |
|---|---|---|---|---|---|---|---|---|---|
| | PRODUCT NUMBER | ITEM | 0:00 | 0:15 | 0:30 | 20:00 | 20:15 | 20:30 | 20:45 |
| LIGHTING APPARATUS | XXXX | ON/OFF | OFF | OFF | OFF | ON | ON | ON | ON |
| | | POWER CONSUMPTION | 0Wh | 0Wh | 0Wh | 50Wh | 52Wh | 51Wh | 50Wh |
| AIR CONDITIONER | YYYY28 | ON/OFF | ON | ON | ON | ON | ON | ON | ON |
| | | OPERATION MODE | COOLING | COOLING | COOLING | COOLING | COOLING | COOLING | COOLING |
| | | SET TEMPERATURE | 27°C | 27°C | 27°C | 27°C | 27°C | 27°C | 27°C |
| | | AIR-FLOW RATE | LOW | LOW | LOW | HIGH | HIGH | HIGH | HIGH |
| | | SUCKED-AIR TEMPERATURE | 27.8°C | 27.9°C | 28.0°C | 27.1°C | 27.2°C | 27.2°C | 27.4°C |
| | | BLOWN-AIR TEMPERATURE | 20.8°C | 20.9°C | 21.0°C | 22.5°C | 22.6°C | 22.9°C | 22.8°C |
| | | OUTDOOR TEMPERATURE | 30.1°C | 30.1°C | 30.2°C | 29.1°C | 29.2°C | 29.1°C | 29.0°C |
| | | POWER CONSUMPTION | 200Wh | 195Wh | 198Wh | 230Wh | 237Wh | 245Wh | 240Wh |

FIG. 3B

EQUIPMENT INFORMATION
(PRODUCT NUMBER, OPERATING STATE, ENVIRONMENTAL CONDITION, POWER CONSUMPTION)

| HOUSEHOLD ELECTRICAL APPLIANCE | EQUIPMENT INFORMATION | | | | | 2002.8.6 | | | |
|---|---|---|---|---|---|---|---|---|---|
| | PRODUCT NUMBER | ITEM | 0:00 | 0:15 | 0:30 | 20:00 | 20:15 | 20:30 | 20:45 |
| REFRIGERATOR | ZZZZ | ON/OFF | ON | ON | ON | ON | ON | ON | ON |
| | | POWER CONSUMPTION | 20Wh | 21Wh | 21Wh | 23Wh | 24Wh | 23Wh | 24Wh |
| HOT-WATER SUPPLYING APPARATUS (ELECTRICITY) | WWWW | PUBLICLY-CIRCULATING WATER TEMPERATURE | 20°C | 21°C | 19°C | 20°C | 21°C | 20°C | 20°C |
| | | STORED HOT-WATER TEMPERATURE | 60°C | 61°C | 63°C | 70°C | 69°C | 70°C | 71°C |
| | | USED-WATER FLOW RATE | 0L | 0L | 0L | 50L | 52L | 60L | 55L |
| | | POWER CONSUMPTION | 4200Wh | 4195Wh | 4198Wh | 4230Wh | 4237Wh | 4245Wh | 4240Wh |
| HOT-WATER SUPPLYING APPARATUS (GAS) | VVVV | PUBLICLY-CIRCULATING WATER TEMPERATURE | 20°C | 21°C | 19°C | 20°C | 21°C | 20°C | 20°C |
| | | SUPPLIED HOT-WATER TEMPERATURE | 42°C | 42°C | 42°C | 42°C | 42°C | 42°C | 42°C |
| | | USED-WATER FLOW RATE | 0L | 0L | 0L | 50L | 52L | 60L | 55L |
| | | GAS CONSUMPTION | 0m² | 0m² | 0m² | 0.1m² | 0.2m² | 0.5m² | 0.6m² |
| | | | | | | | | | |

FIG. 5

FOR AIR CONDITIONER

| HOUSEHOLD ELECTRICAL APPLIANCE | ROOM | CAPACITY | PRODUCT NUMBER | PRICE | COP | |
|---|---|---|---|---|---|---|
| | | | | | COOLING OPERATION | HEATING OPERATION |
| AIR CONDITIONER | 7 TO 10 MATS | COOLING CAPACITY 2.5kW | AAAA25 | ********YEN | 5.95 | 5.76 |
| | | | BBBB25 | ********YEN | 5.26 | 5.31 |
| | | | CCCC25 | ********YEN | 3.03 | 3.82 |
| | 8 TO 12 MATS | COOLING CAPACITY 2.8kW | AAAA28 | 82,000YEN | 6.09 | 5.93 |
| | | | BBBB28 | 78,000YEN | 5.66 | 5.76 |
| | | | CCCC28 | 70,000YEN | 3.66 | 3.37 |
| | ... | ... | ... | ... | ... | ... |

FOR TV SET

| HOUSEHOLD ELECTRICAL APPLIANCE | SIZE | PRODUCT NUMBER | PRICE | RATED POWER CONSUMPTION | |
|---|---|---|---|---|---|
| | | | | IN OPERATION | ON STANDBY |
| TV SET | 29 INCHES | DDDD | *****YEN | 130(W) | 0.5(W) |
| | 32 INCHES | EEEE | *****YEN | 180(W) | 0.3(W) |
| | 36 INCHES | FFFF | *****YEN | 210(W) | 0.2(W) |
| | ... | ... | ... | ... | ... |

FOR LIGHTING APPARATUS

| HOUSEHOLD ELECTRICAL APPLIANCE | ROOM | PRODUCT NUMBER | PRICE | RATED POWER CONSUMPTION |
|---|---|---|---|---|
| LIGHTING APPARATUS | 6 TO 8 MATS | DDDD | *****YEN | 64(W) |
| | 8 TO 10 MATS | EEEE | *****YEN | 81(W) |
| | 10 TO 12 MATS | FFFF | *****YEN | 94(W) |
| | ... | ... | ... | ... |

FIG. 7

ENERGY-SAVING RECOMMENDED-EQUIPMENT INFORMATION (AIR CONDITIONER)

| HOUSEHOLD ELECTRICAL APPLIANCE | EQUIPMENT IN HOUSE | | | RECOMMENDED EQUIPMENT | | | | ESTIMATED SAVED ENERGY | | |
|---|---|---|---|---|---|---|---|---|---|---|
| | PRODUCT NUMBER | USAGE RECORD | TOTAL POWER CONSUMPTION | MANUFACTURER | PRODUCT NUMBER | ESTIMATED POWER CONSUMPTION | PRICE | YEARLY SAVED POWER-CONSUMPTION | YEARLY SAVED AMOUNT | REPAYMENT YEARS |
| AIR CONDITIONER | YYYY28 | 1560 HOURS /YEAR | 1561 KWH/YEAR | MANUFACTURER A | AAAA28 | 906 kWh/YEAR | 82,000 YEN | 655 kWh/YEAR | 15,720 YEN/YEAR | 5.2 YEARS |
| | | | | | BBBB28 | 990 kWh/YEAR | 78,000 YEN | 571kWh/YEAR | 13,704 YEN/YEAR | 5.6 YEARS |
| | | | | | CCCC28 | 1100 kWh/YEAR | 70,000 YEN | 461kWh/YEAR | 11,064 YEN/YEAR | 6.3 YEARS |
| | | | | MANUFACTURER B | *******28 | ***** kWh/YEAR | ******** YEN | ****kWh/YEAR | ******* YEN/YEAR | ** YEARS |
| | | | | | *******28 | ***** kWh/YEAR | ******** YEN | ****kWh/YEAR | ******* YEN/YEAR | ** YEARS |
| | | | | | *******28 | ***** kWh/YEAR | ******** YEN | ****kWh/YEAR | ******* YEN/YEAR | ** YEARS |

ENERGY MANAGEMENT SYSTEM, ENERGY MANAGEMENT METHOD, AND UNIT FOR PROVIDING INFORMATION ON ENERGY-SAVING RECOMMENDED EQUIPMENT

BACKGROUND OF THE INVENTION

1. Field of the Invention

The present invention relates to an energy management system, an energy management method and a unit for providing information on energy-saving recommended equipment which are capable of promoting energy conservation of equipment for home use.

2. Description of the Related Art

When you want people to save energy in their houses, it is said to be essential to heighten their awareness of energy conservation. To realize this, a number of systems have conventionally been developed which can measure their energy consumption in real time and display it to them. Particularly, with respect to electrical energy, proposals have been made for the method of measuring in real time the power consumption of electrical equipment which consumes a large amount of power, such as an air conditioner, and then displaying it to those who live there.

For example, in Patent Document 1, a display portion is provided in the body of an air conditioner, so that residents can confirm the power consumption of the air conditioner in real time. In addition, Patent Document 2 discloses that a sensor is provided in a master watt-hour meter, and a separately-provided display portion displays a power consumption or its corresponding charge.

Herein, Patent Document 1 is Japanese Patent Laid-Open No.11-281122 specification, and Patent Document 2 is Japanese Patent Laid-Open No. 9-53954 specification.

However, according to these prior arts, a display is made only of a usage situation of electrical equipment used by a person who lives in a house, or merely of how it has been used. This may prompt the person to devise how to use it for energy conservation, but it would not urge the person to replace it with a new product. Hence, no energy-saving effect cannot be expected from this. For example, in the case of equipment on the top-runner list, such as an air conditioner, a TV set, a refrigerator and a washing machine, a new product is always energy-saving equipment. Thus, if you purchases it to replace the old one, you can conserve energy very much. However, it is difficult for a person who lives in a house to judge when to buy a new product. This is mainly because a catalog or the like tells you how much energy-saving effect a new product has quantitatively compared with its old model, but for example, a standard value is set as hours in use or the like. This not necessarily corresponds to how a resident will actually use the new product. Therefore, the energy-saving effect itself can be separated from the effect produced according to the resident's actual usage conditions. Accordingly, the resident may feel that the energy-saving effect itself is not real, and thus, refrain from buying the new product.

DISCLOSURE OF THE INVENTION

In order to resolve the above described disadvantages, it is an object of the present invention to provide an energy management system, an energy management method and a unit for providing information on energy-saving recommended equipment which are capable of prompting a person who lives in a house to replace electrical equipment which is used by the person with new such equipment, and thus, realizing energy conservation.

In order to attain the above described object, an energy management system according to the present invention, comprising: an equipment-information obtaining means for obtaining equipment information on how equipment has been used; an energy-saving equipment-information storing means for storing energy-saving equipment information on the performance of a plurality of pieces of energy-saving equipment whose energy consumption is more efficient than that of the equipment; an energy-saving recommended-equipment information creating means for obtaining energy-saving equipment information from the energy-saving equipment-information storing means, then based on the obtained energy-saving equipment information and the equipment information obtained by the equipment-information obtaining means, from among the plurality of pieces of energy-saving equipment, selecting, as energy-saving recommended equipment, energy-saving equipment according to how the equipment has been used, and creating energy-saving recommended-equipment information on the selected energy-saving recommended equipment; and a displaying means for displaying the energy-saving recommended-equipment information created by the energy-saving recommended-equipment information creating means.

According to this configuration, equipment information on how equipment has been used is obtained by the equipment-information obtaining means. In the energy-saving equipment-information storing means, there are stored energy-saving equipment information on the performance of a plurality of pieces of energy-saving equipment whose energy consumption is more efficient than that of the equipment which is used in a house. By the energy-saving recommended-equipment information creating means, energy-saving equipment information is obtained from the energy-saving equipment-information storing means, then based on the obtained energy-saving equipment information and the obtained equipment information, from among the plurality of pieces of energy-saving equipment, energy-saving equipment according to how the equipment has been used is selected as energy-saving recommended equipment, and energy-saving recommended-equipment information on the selected energy-saving recommended equipment is created. Then, the created energy-saving recommended-equipment information is displayed by the displaying means.

Therefore, equipment which has a higher energy-consumption efficiency than that of equipment which is used in a house and corresponds to how the equipment which is used in a house has been used, is selected as energy-saving recommended equipment. Then, energy-saving recommended-equipment information on the selected energy-saving recommended equipment is presented to a user. This prompts a person who lives in a house to purchase new equipment and replace the equipment which is used by the person. Accordingly, the person can buy equipment whose energy efficiency is higher than that of the equipment which is domestically used, thereby realizing energy conservation.

Furthermore, in the above described energy management system, preferably, the equipment-information obtaining means, the energy-saving recommended-equipment information creating means, the energy-saving equipment-information storing means and the displaying means are connected over a network; the equipment-information obtaining means obtains equipment information on how equipment has been used, and transmits the obtained equipment information to the energy-saving recommended-equipment information creating means; the energy-saving recommended-equipment information creating means obtains energy-saving equipment information from the energy-saving equipment-information storing means, then based on the obtained energy-saving equipment information and the equipment information transmitted by the equipment-information obtaining means, from among the plurality of pieces of energy-saving equipment, selects, as energy-saving recommended equipment, energy-saving equipment according to how the equipment has been used, then creates energy-saving recommended-equipment information on the selected energy-saving recommended equipment, and transmits the created energy-saving recommended-equipment information to the displaying means; and the displaying means displays the energy-saving recommended-equipment information which is transmitted by the energy-saving recommended-equipment information creating means.

According to this configuration, the equipment-information obtaining means, the energy-saving recommended-equipment information creating means, the energy-saving equipment-information storing means and the displaying means are connected over a network. By the equipment-information obtaining means, equipment information on how equipment has been used is obtained, and the obtained equipment information is transmitted to the energy-saving recommended-equipment information creating means. Next, by the energy-saving recommended-equipment information creating means, energy-saving equipment information is obtained from the energy-saving equipment-information storing means, then based on the obtained energy-saving equipment information and the equipment information transmitted by the equipment-information obtaining means, from among the plurality of pieces of energy-saving equipment, energy-saving equipment according to how the equipment has been used is selected as energy-saving recommended equipment, then energy-saving recommended-equipment information on the selected energy-saving recommended equipment is created, and the created energy-saving recommended-equipment information is transmitted to the displaying means. Next, by the displaying means, there is displayed the energy-saving recommended-equipment information which is transmitted by the energy-saving recommended-equipment information creating means. Therefore, if new energy-saving equipment is sold, then information can be swiftly updated, thus facilitating the update of new information.

Moreover, in the above described energy management system, preferably, the equipment-information obtaining means obtains, as the equipment information, consumed energy-quantity information which is used to specify the quantity of energy consumed when the equipment is used in a house; and the energy-saving recommended-equipment information creating means includes, an energy-saving equipment-information obtaining means for obtaining, from the energy-saving equipment-information storing means, energy-saving equipment information on the same type of energy-saving equipment as equipment which is used in a house at present, an estimated energy-quantity arithmetically-operating means for calculating, based on the energy-saving equipment information obtained by the energy-saving equipment-information obtaining means and the equipment information, the quantity of energy estimated when the equipment which is used in a house is replaced with the energy-saving equipment, and an energy-saving recommended-equipment selecting means for comparing the estimated energy quantity calculated by the estimated energy-quantity arithmetically-operating means and the consumed energy quantity obtained by the equipment-information obtaining means, and selecting, as energy-saving recommended equipment, energy-saving equipment which has the estimated energy quantity smaller than the consumed energy quantity.

According to this configuration, by the equipment-information obtaining means, consumed energy-quantity information which is used to specify the quantity of energy consumed when the equipment is used in a house is obtained as the equipment information. Then, by the energy-saving equipment-information obtaining means, energy-saving equipment information on the same type of energy-saving equipment as equipment which is used in a house at present is obtained from the energy-saving equipment-information storing means. Next, by the estimated energy-quantity arithmetically-operating means, based on the obtained energy-saving equipment information and the equipment information, the quantity of energy estimated when the equipment which is used in a house is replaced with the energy-saving equipment is calculated. Then, by the energy-saving recommended-equipment selecting means, the estimated energy quantity which has been calculated and the consumed energy quantity which has been obtained are compared, and energy-saving equipment which has the estimated energy quantity smaller than the consumed energy quantity is selected as energy-saving recommended equipment.

Accordingly, when the same type of energy-saving equipment as equipment which is used in a house at present is used in the house, its estimated energy quantity is calculated. Then, energy-saving equipment which has the calculated estimated energy quantity smaller than the actual consumed energy quantity is selected as energy-saving recommended equipment. Therefore, energy-saving equipment whose energy efficiency is higher than that of the equipment which is currently used can be selected. Hence, when equipment is purchased to replace old such equipment, its energy quantity can be estimated according to how the old equipment has been used in each house.

In addition, in the above described energy management system, preferably, the equipment-information obtaining means obtains, as the equipment information, consumed energy-quantity information which is used to specify the quantity of energy consumed when the equipment is used in a house; and the energy-saving recommended-equipment information creating means includes, an energy-saving equipment-information obtaining means for obtaining, from the energy-saving equipment-information storing means, energy-saving equipment information on energy-saving equipment whose performance is as good as that of equipment which is used in a house at present, an estimated energy-quantity arithmetically-operating means for calculating, based on the energy-saving equipment information obtained by the energy-saving equipment-information obtaining means and the equipment information, the quantity of energy estimated when the equipment which is used in a house is replaced with the energy-saving equipment, and an energy-saving recommended-equipment selecting means for comparing the estimated energy quantity calculated by the estimated energy-quantity arithmetically-operating means and the consumed energy quantity obtained by the equipment-information obtaining means, and selecting, as energy-saving recommended equipment, energy-saving equipment which has the estimated energy quantity smaller than the consumed energy quantity.

According to this configuration, by the equipment-information obtaining means, consumed energy-quantity information which is used to specify the quantity of energy consumed when the equipment is used in a house is obtained as the equipment information. Then, by the energy-saving equipment-information obtaining means, energy-saving equipment information on energy-saving equipment whose performance is as good as that of equipment which is used in a house at present is obtained from the energy-saving equipment-information storing means. Next, by the estimated energy-quantity arithmetically-operating means, based on the obtained energy-saving equipment information and the equipment information, the quantity of energy estimated when the equipment which is used in a house is replaced with the energy-saving equipment is calculated. Then, by the energy-saving recommended-equipment selecting means, the estimated energy quantity which has been calculated and the consumed energy quantity which has been obtained are compared, and energy-saving equipment which has the estimated energy quantity smaller than the consumed energy quantity is selected as energy-saving recommended equipment.

Therefore, when energy-saving equipment whose performance is as good as that of equipment which is used in a house at present is used in the house, its estimated energy quantity is calculated. Then, energy-saving equipment which has the calculated estimated energy quantity smaller than the actual consumed energy quantity is selected as energy-saving recommended equipment. Therefore, energy-saving equipment whose energy efficiency is higher than that of the equipment which is currently used can be selected. Hence, when equipment which has a performance as good as that of equipment which is used at present by a user is purchased to replace the existing equipment, its energy quantity can be estimated according to how the existing equipment has been used in each house.

Furthermore, in the above described energy management system, preferably, the energy-saving recommended-equipment information includes the product number and price of the energy-saving equipment, and the quantity of energy estimated when a replacement is made with the energy-saving equipment; and the displaying means displays the product number and the price of the energy-saving recommended equipment, and compares and displays the estimated energy quantity and the consumed energy quantity obtained by the equipment-information obtaining means.

According to this configuration, in the energy-saving recommended-equipment information, there are included the product number and price of the energy-saving equipment, and the quantity of energy estimated when a replacement is made with the energy-saving equipment. Then, by the displaying means, the product number and the price of the energy-saving recommended equipment are displayed, and the estimated energy quantity and the consumed energy quantity are compared and displayed. Therefore, a user can compare the quantity of energy estimated when a replacement is made with the energy-saving equipment and the consumed energy quantity of equipment which is domestically used. This allows the user to become aware how much electricity can be saved if equipment which is presently used is replaced with energy-saving equipment.

Moreover, in the above described energy management system, preferably, the equipment-information obtaining means obtains, as the equipment information, at least either of operating-state information including the operating time and operation mode of the equipment, and environmental-condition information including the temperature around the equipment and the outside-air temperature, the product number of the equipment, and the consumed energy quantity of the equipment; the energy-saving equipment-information obtaining means obtains the product number, price and energy-consumption efficiency of the energy-saving equipment; the estimated energy-quantity arithmetically-operating means includes, an actual-load calculating means for calculating an actual thermal load of the equipment, based on at least either of the operating-state information and the environmental-condition information which are obtained by the equipment-information obtaining means, and an estimated energy-quantity calculating means for calculating the quantity of energy estimated when the energy-saving equipment which has the energy-consumption efficiency obtained by the energy-saving equipment-information obtaining means is used at the thermal load calculated by the actual-load calculating means; and the energy-saving recommended-equipment selecting means compares the estimated energy quantity calculated by the estimated energy-quantity calculating means and the consumed energy quantity obtained by the equipment-information obtaining means, then selects, as energy-saving recommended equipment, energy-saving equipment which has the estimated energy quantity smaller than the consumed energy quantity, and creates energy-saving recommended-equipment information which includes the product number of the equipment obtained by the equipment-information obtaining means, the product number and price of the energy-saving equipment which are included in the energy-saving equipment information obtained by the energy-saving equipment-information obtaining means, the estimated energy quantity calculated by the estimated energy-quantity calculating means, and the consumed energy quantity obtained by the equipment-information obtaining means.

According to this configuration, by the equipment-information obtaining means, at least either of operating-state information including the operating time and operation mode of the equipment, and environmental-condition information including the temperature around the equipment and the outside-air temperature, the product number of the equipment, and the consumed energy quantity of the equipment are obtained as the equipment information. Then, by the energy-saving equipment-information obtaining means, the product number, price and energy-consumption efficiency of the energy-saving equipment are obtained. Next, by the actual-load calculating means, an actual thermal load of the equipment is calculated based on at least either of the operating-state information and the environmental-condition information which have been obtained. Then, by the estimated energy-quantity calculating means, the quantity of energy estimated when the energy-saving equipment which has the obtained energy-consumption efficiency is used at the calculated thermal load is calculated. Next, by the energy-saving recommended-equipment selecting means, the estimated energy quantity which has been calculated and the consumed energy quantity which has been obtained are compared, then energy-saving equipment which has the estimated energy quantity smaller than the consumed energy quantity is selected as energy-saving recommended equipment, and energy-saving recommended-equipment information which includes the product number of the obtained equipment, the product number and price of the energy-saving equipment which are included in the obtained energy-saving equipment information, the estimated energy quantity which has been calculated, and the consumed energy quantity which has been obtained, are created.

Accordingly, an actual thermal load of the equipment is calculated based on at least either of an operating state including the operating time and operation mode of the equipment, and an environmental condition including the temperature around the equipment and the outside-air temperature. Then, the quantity of energy estimated when the energy-saving equipment which has the obtained energy-consumption efficiency is used at the calculated thermal load is calculated. Therefore, the quantity of energy estimated when the equipment which is domestically used is replaced with the energy-saving equipment can be calculated. This allows you to precisely simulate, according to how the equipment has been used, the quantity of energy at the time when it is replaced with the energy-saving equipment.

An energy management method according to the present invention, which is executed by using an equipment-information obtaining unit which obtains predetermined information from equipment, an energy-saving equipment-information storage unit which stores energy-saving equipment information on the performance of a plurality of pieces of energy-saving equipment whose energy consumption is more efficient than that of the equipment, an energy-saving recommended-equipment information creation unit which creates energy-saving recommended-equipment information on energy-saving recommended equipment whose energy consumption is more efficient than that of the equipment from among the pieces of energy-saving equipment, and a display unit which displays the energy-saving recommended-equipment information, comprising: an equipment-information obtaining step of, by using the equipment-information obtaining unit, obtaining equipment information on how equipment which is used in a house has been used; an energy-saving recommended-equipment information creating step of, by using the energy-saving recommended-equipment information creation unit, obtaining the energy-saving equipment information stored in the energy-saving equipment-information storage unit, then based on the obtained energy-saving equipment information and the equipment information obtained in the equipment-information obtaining step, from among the plurality of pieces of energy-saving equipment, selecting, as energy-saving recommended equipment, energy-saving equipment according to how the equipment has been used, and creating energy-saving recommended-equipment information on the selected energy-saving recommended equipment; and a displaying step of, by using the display unit, displaying the energy-saving recommended-equipment information created in the energy-saving recommended-equipment information creating step.

According to this configuration, in the equipment-information obtaining step, equipment information on how equipment has been used is obtained. In the energy-saving equipment-information storage unit, there is stored energy-saving equipment information on the performance of a plurality of pieces of energy-saving equipment whose energy consumption is more efficient than that of the equipment which is used in a house. In the energy-saving recommended-equipment information creating step, the energy-saving equipment information is obtained from the energy-saving equipment-information storage unit, then based on the obtained energy-saving equipment information and the obtained equipment information, from among the plurality of pieces of energy-saving equipment, energy-saving equipment according to how the equipment has been used is selected as energy-saving recommended equipment, and energy-saving recommended-equipment information on the selected energy-saving recommended equipment is created. Then, in the displaying step, the created energy-saving recommended-equipment information is displayed.

Accordingly, equipment which has a higher energy-consumption efficiency than that of equipment which is used in a house and corresponds to how the equipment which is used in a house has been used, is selected as energy-saving recommended equipment. Then, energy-saving recommended-equipment information on the selected energy-saving recommended equipment is presented to a user. This prompts a person who lives in a house to purchase new equipment and replace electrical equipment which is used by the person. Accordingly, the person can buy equipment whose energy efficiency is higher than that of the equipment which is domestically used, thereby realizing energy conservation.

A unit for providing information on energy-saving recommended equipment according to the present invention, which provides, as energy-saving recommended-equipment information, information on energy-saving equipment whose energy efficiency is higher than that of equipment which is used in a house at present, comprising: an equipment-information obtaining means for obtaining equipment information on how the equipment which is used in a house has been used; an energy-saving equipment-information obtaining means for obtaining energy-saving equipment information from an energy-saving equipment-information storing means which stores energy-saving equipment information on the performance of a plurality of pieces of energy-saving equipment whose energy consumption is more efficient than that of the equipment; an estimated energy-quantity arithmetically-operating means for calculating, based on the energy-saving equipment information obtained by the energy-saving equipment-information obtaining means and the equipment information obtained by the equipment-information obtaining means, the quantity of energy estimated when the equipment which is used in a house is replaced with the energy-saving equipment; an energy-saving recommended-equipment selecting means for comparing the estimated energy quantity calculated by the estimated energy-quantity arithmetically-operating means and the consumed energy quantity obtained by the equipment-information obtaining means, and selecting, as energy-saving recommended equipment, energy-saving equipment which has the estimated energy quantity smaller than the consumed energy quantity; and a transmitting means for transmitting, to a display unit, the energy-saving recommended-equipment information on the energy-saving recommended equipment selected by the energy-saving recommended-equipment selecting means.

According to this configuration, by the equipment-information obtaining means, equipment information on how the equipment which is used in a house has been used is obtained. Then, by the energy-saving equipment-information obtaining means, energy-saving equipment information is obtained from the energy-saving equipment-information storing means which stores energy-saving equipment information on the performance of a plurality of pieces of energy-saving equipment whose energy consumption is more efficient than that of the equipment which is domestically used. Next, by the estimated energy-quantity arithmetically-operating means, based on the obtained energy-saving equipment information and the obtained equipment information, the quantity of energy estimated when the equipment which is used in a house is replaced with the energy-saving equipment is calculated. Then, by the energy-saving recommended-equipment selecting means, the estimated energy quantity which has been calculated and the consumed energy quantity which has been obtained are compared, and energy-saving equipment which has the estimated energy quantity smaller than the consumed energy quantity is selected as energy-saving recommended equipment. Next, by the transmitting means, the energy-saving recommended-equipment information on the selected energy-saving recommended equipment is transmitted to the display unit. Then, by the display unit, the created energy-saving recommended-equipment information is displayed.

Accordingly, equipment which has a higher energy-consumption efficiency than that of equipment which is used in a house and corresponds to how the equipment which is used in a house has been used, is selected as energy-saving recommended equipment. Then, energy-saving recommended-equipment information on the selected energy-saving recommended equipment is transmitted to the display unit. Next, by the display unit, the energy-saving recommended-equipment information is presented to a user. This prompts a person who lives in a house to purchase new equipment and replace electrical equipment which is used by the person. Accordingly, the person can buy equipment whose energy efficiency is higher than that of the equipment which is domestically used, thereby realizing energy conservation.

As described hereinbefore, according to the present invention, equipment which has a higher energy-consumption efficiency than that of equipment which is used in a house and corresponds to how the equipment which is used in a house has been used, is selected as energy-saving recommended equipment. Then, energy-saving recommended-equipment information on the selected energy-saving recommended equipment is presented to a user. This prompts a person who lives in a house to purchase new equipment and replace electrical equipment which is used by the person. Accordingly, the person can buy equipment whose energy efficiency is higher than that of the equipment which is domestically used, thereby realizing energy conservation.

These and other objects, features and advantages of the present invention will become more apparent upon reading of the following detailed description along with the accompanied drawings.

BRIEF DESCRIPTION OF THE DRAWINGS

FIGS. 3A and 3B are tables, showing an example of equipment information according to this embodiment.

FIG. 5 is a table, showing an example of an energy-saving equipment database according to this embodiment.

FIG. 7 is a table which is displayed as an example by a display unit according to this embodiment.

DETAILED DESCRIPTION OF INVENTION

Hereinafter, the embodiment of the present invention will be described with reference to the drawings.

Figure 1:
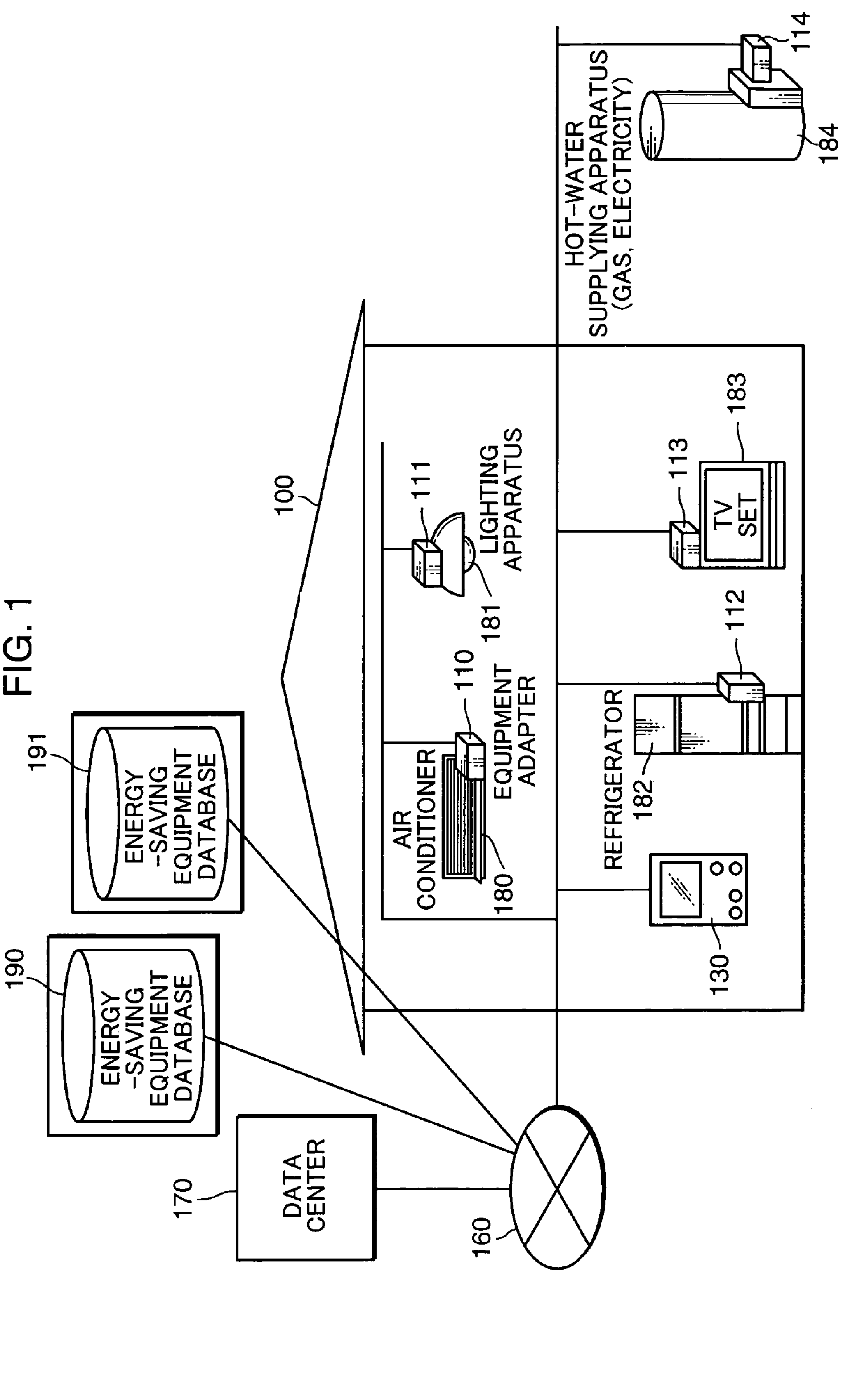
FIG. 1 is a schematic illustration of the configuration of an energy management system according to the embodiment of the present invention.

FIG. 1 is a schematic illustration of the configuration of an energy management system according to this embodiment. This energy management system is configured by: equipment adapters 110 to 114 which are each connected directly to electrical equipment or the like (e.g., an air conditioner 180) which is used in a house 100, and obtain equipment information including its power consumption and operating state; a data center 170 which collects from each house, over a communication network 160, equipment information obtained by the equipment adapters 110 to 114, and manages the collected equipment information; energy-saving equipment databases 190, 191 which store energy-saving equipment data on energy-saving equipment of each manufacturer; and a display unit 130 which displays a power consumption indicated by the equipment adapters 110 to 114, or information from the data center 170, so that a resident can check it.

Electrical equipment is equipment which can be connected to a home network, including not only a so-called household electrical appliance, but also housing equipment, a sensor which measures and detects a living environment, and the like. Herein, "electrical equipment" is used as the general term for those pieces of equipment. In addition, the electrical equipment according to this embodiment is equipment whose energy source is electricity. Hence, the energy management system in which electrical equipment is mainly used will be described below. However, the present invention is not limited especially to this, and thus, equipment which operates, as its energy source, for example, using another kind of energy such as gas, can also be applied in the same way.

In the house 100, there are placed, in addition to the air conditioner 180, a lighting apparatus 181, a refrigerator 182, a TV set 183, a hot-water supplying apparatus 184, and the like. An equipment adapter 111 is connected to the lighting apparatus 181; an equipment adapter 112, to the refrigerator 182; an equipment adapter 113, to the TV set 183; and an equipment adapter 114, to the hot-water supplying apparatus 184 whose energy source is gas or electricity. The energy-saving equipment databases 190, 191 belong to manufacturers A, B, respectively, and hold data on energy-saving equipment of each manufacturer A, B. That data can be obtained from the data center 170 over the communication network 160.

Herein, the energy-saving equipment is electrical equipment whose energy-saving effect is greater than that of conventional electrical equipment. With respect to equipment on the so-called top-runner list, such as an air conditioner, a TV set and a refrigerator, any new products on the market must have a performance as good as, or better than, that of the equipment which has the highest energy-consumption efficiency of all such products on sale at present. Therefore, the latest model of equipment has a greater energy-saving effect than any conventional one. In other words, you can say that the newest model of electrical equipment which will come onto the market is energy-saving equipment. In addition, the function of each equipment adapter 110 to 114 may also be integrated in advance into their corresponding electrical equipment 180 to 184.

The network 160 is an outside communication network which is configured by a switched line such as a telephone line and a digital line, a leased line, or the like. Herein, the network 160 is not limited especially to this example, and thus, various wide-area networks can be used. In addition, a private circuit, another public circuit, the Internet, or the like, may also be used. Besides, either of wired and wireless systems may also be used.

Figure 2:
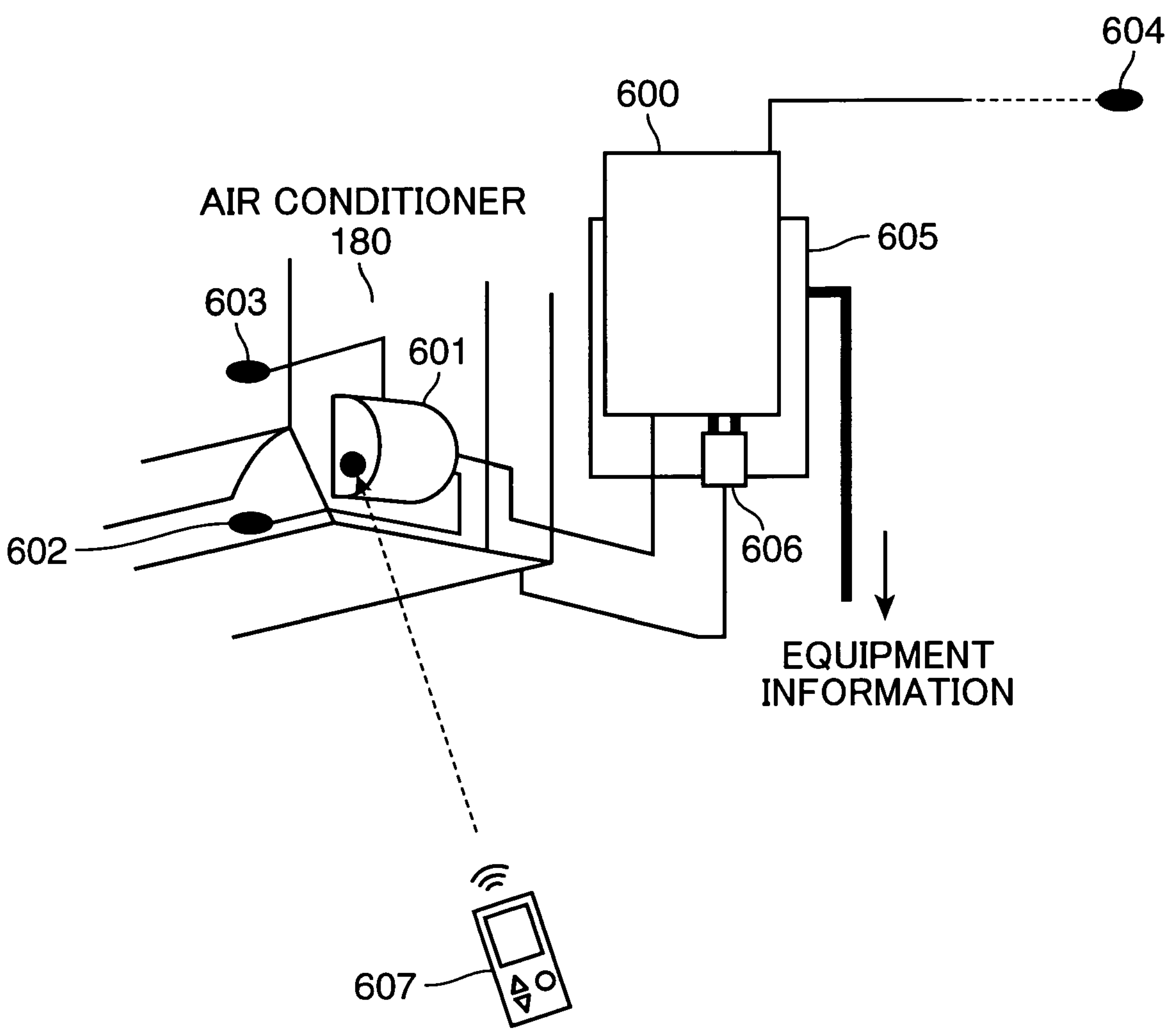
FIG. 2 is an illustration of the configuration of an equipment adapter for an air conditioner according to this embodiment.

FIG. 2 is an illustration of the configuration of the equipment adapter 110 used for the air conditioner 180. A main-body portion 600 of the equipment adapter 110 is inserted between a plug socket 605 and a plug 606 of the air conditioner 180. It measures a power consumption of the air conditioner 180. A person who lives in a house can check an operating state of the air conditioner 180, using an infrared remote control 607. If the person operates the remote control 607, an infrared signal is outputted, and is received by an infrared receiving portion 601. Herein, the operating state represents, for example, whether the power is turned ON/OFF, an operation mode such as cooling/heating, a set temperature, an air-flow rate, or the like. The air conditioner 180 is provided with, as a means of checking an environmental condition around the air conditioner 180: a blown-air temperature detection portion 602 which detects the temperature of the air that is blown from the air conditioner 180; a sucked-air temperature detection portion 603 which detects the temperature of the air that is sucked into the air conditioner 180; and an outside-air temperature detection portion 604 which detects the temperature of the outside air. In the equipment adapter 110, the product number of its corresponding air conditioner 180 is inputted beforehand, or it is inputted with the display unit 130 by a user and is communicated from the display unit 130.

The equipment adapter 110 can transmit, to the network 160, equipment information such as the power consumption, operating state, environmental condition and product number which have been obtained from the air conditioner 180, when they are inquired from outside. As a means of communicating with the network 160, for example, an electric-lamp wire communication, a radio communication, or the like, is used in a house. To realize that, a communication module is embodied in the main-body portion 600 of the equipment adapter 110.

In FIG. 2, there is shown the configuration of the equipment adapter 110 used for the air conditioner 180. However, equipment information which is obtained by the equipment adapter 111 used for the lighting apparatus 181 is only its power consumption and operating state (i.e., whether the power is turned ON/OFF). Besides, in the case of the TV set 183, its operating-state equipment information may also include a parameter of brightness. Hence, the equipment information obtained by each equipment adapter 111 to 114 varies according to their corresponding electrical equipment 180 to 184.

Hereinafter, an operation will be described of the energy management system according to this embodiment. First, the data center 170 collects equipment information from each equipment adapter which is provided in a house. FIG. 3A and FIG. 3B are tables, showing an example of equipment information on each piece of electrical equipment which is used in a house.

As shown in FIG. 3A, equipment information on a lighting apparatus includes its product number, power ON/OFF state which is obtained every fifteen minutes, and power consumption which is obtained at intervals of fifteen minutes. On the other hand, equipment information on an air conditioner includes its product number, and its power ON/OFF state, operation mode, set temperature, air-flow rate, sucked-air temperature, blown-air temperature, outdoor temperature and power consumption which are each obtained at intervals of fifteen minutes. In short, the lighting apparatus and the air conditioner differ as to required equipment information. This is because the items which relate to the power consumption of equipment are different for each piece of equipment. In the lighting apparatus, if its ON/OFF state is obtained, the power consumption of the lighting apparatus can be almost calculated. However, in the case of the air conditioner, its ON/OFF state alone does not determine its power consumption. Its operation mode, sucked-air temperature, blown-air temperature, outdoor temperature and another such item are also necessary for calculating the power consumption.

As shown in FIG. 3B, with respect to a refrigerator, its equipment information includes its product number, power ON/OFF state which is obtained every fifteen minutes, and power consumption which is obtained at intervals of fifteen minutes. In equipment information on an electric hot-water supplying apparatus, there are included its product number, and a publicly-circulating water temperature, its stored hot-water temperature, used-water flow rate and power consumption which are each obtained at intervals of fifteen minutes. Equipment information on a gas hot-water supplying apparatus includes its product number, and a publicly-circulating water temperature, its supplied hot-water temperature, used-water flow rate and gas consumption which are each obtained every fifteen minutes. In other words, in the case of the electric hot-water supplying apparatus, the relation between the power consumption and the quantity of heat generated by the hot-water supplying apparatus needs to be obtained. This requires, as its equipment information, the stored hot-water temperature, a publicly-circulating water temperature and the used-water flow rate, as well as the power consumption. On the other hand, in the case of the gas hot-water supplying apparatus, the relation between the gas consumption and the quantity of heat needs to be obtained. This requires, as its equipment information, the supplied hot-water temperature, a publicly-circulating water temperature and the used-water flow rate, as well as the gas consumption.

Herein, according to this embodiment, equipment information is obtained every fifteen minutes. However, the present invention is not limited especially to this, and thus, it may also be obtained, for example, at intervals of half an hour. In short, the timing in which equipment information is obtained can be suitably set. Besides, the shorter the interval at which equipment information is obtained becomes, the more precisely how the electrical equipment has been used by a user can be checked. According to this embodiment, communication traffic is taken into account, and thus, the interval at which equipment information is obtained is set to a quarter of an hour.

The data center 170 creates, based on the collected equipment information, information on energy-saving equipment recommendation in the case where a replacement is made with an energy-saving type of equipment. Then, it transmits it to the house 100. This energy-saving equipment recommendation information is a power consumption estimated at the time when a replacement is made with a type of equipment similar to the equipment which is now used domestically from among energy-saving types of equipment (which is generally new products) which is held by a manufacturer, its product number, price and the like. Herein, the similar type of equipment is equipment which has almost the same level of basic performance. For example, in the case of an air conditioner, it is the type of equipment which has a cooling capacity of the same level; in a refrigerator, the same volume; and in a TV set, the same screen size.

Figure 4:
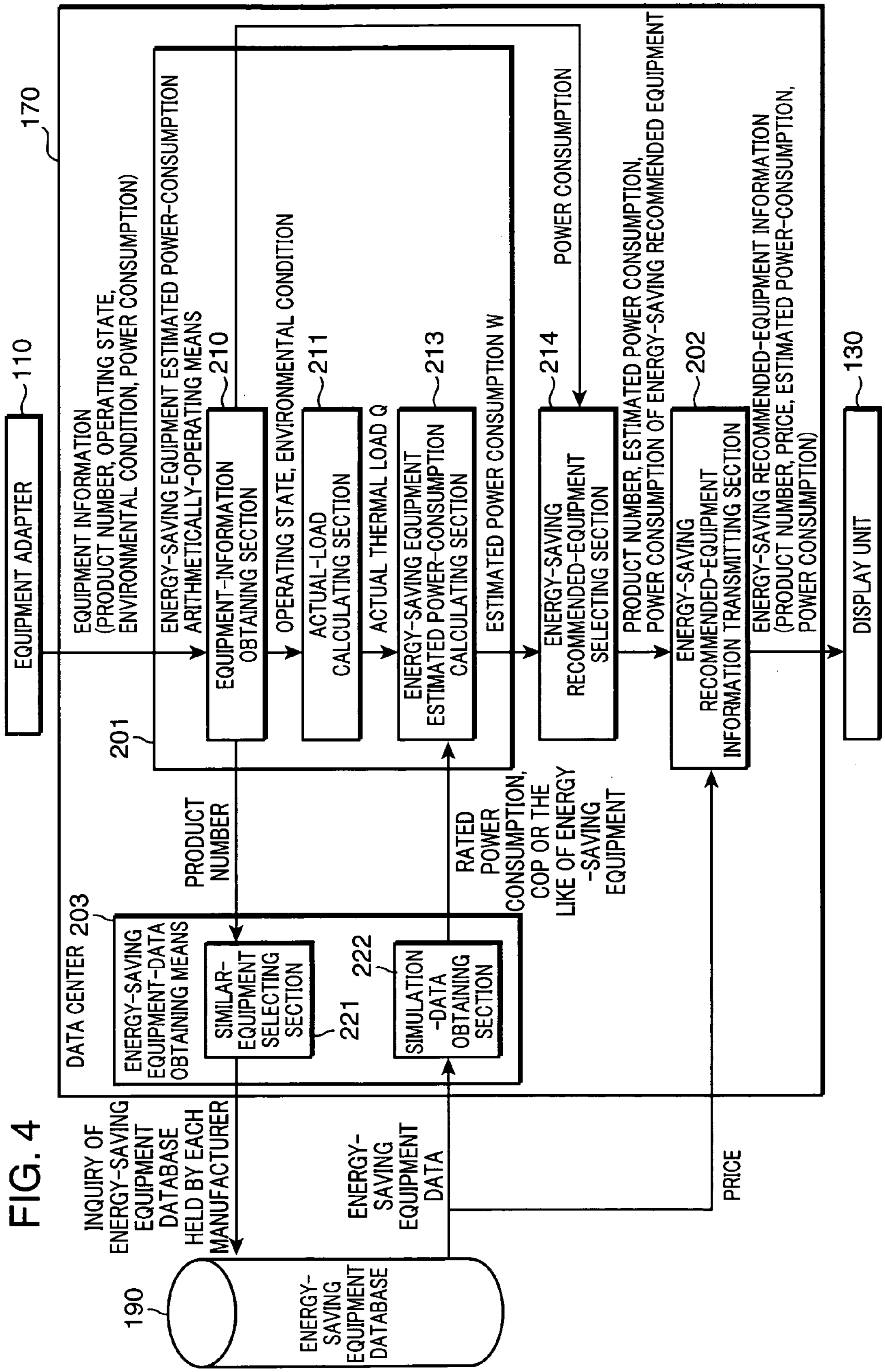
FIG. 4 is a block diagram, showing the functional configuration of a data center according to this embodiment.

FIG. 4 is a block diagram, showing a configuration of the function of calculating energy-saving equipment information in the energy management system. The energy management system shown in FIG. 4 includes the equipment adapter 110, the display unit 130, the data center 170 and the energy-saving equipment database 190. The data center 170 is configured by: an energy-saving equipment estimated power-consumption arithmetically-operating section 201 which obtains equipment information and calculates a power consumption estimated when a replacement is made with energy-saving equipment; an energy-saving equipment-data obtaining section 203 which inquires of the energy-saving equipment databases 190, 191 that belong to manufacturers, obtains energy-saving equipment data and provides it to the energy-saving equipment estimated power-consumption arithmetically-operating section 201; an energy-saving recommended-equipment selecting section 214 which selects energy-saving recommended equipment; and an energy-saving recommended-equipment information transmitting section 202 which transmits energy-saving recommended-equipment information to the display unit 130.

The energy-saving equipment estimated power-consumption arithmetically-operating section 201 includes an equipment-information obtaining section 210, an actual-load calculating section 211, and an energy-saving equipment estimated power-consumption calculating section 213. The energy-saving equipment-data obtaining section 203 includes a similar-equipment selecting section 221 and a simulation-data obtaining section 222.

The equipment-information obtaining section 210 obtains, from the equipment adapter 110, equipment information which includes the number of a product, an operating state, an environmental condition and a power consumption. Specifically, the equipment-information obtaining section 210 transmits a demand for obtaining equipment-information to the equipment adapter 110. Then, the equipment adapter 110 which has received the equipment-information obtaining demand transmits the equipment information to the equipment-information obtaining section 210. Next, from among the equipment information it has obtained, the equipment-information obtaining section 210 outputs the product number to the similar-equipment selecting section 221, outputs the operating state and the environmental condition to the actual-load calculating section 211, and outputs the power consumption to the energy-saving recommended-equipment selecting section 214. Then, the equipment-information obtaining section 210 stores, as a history, the equipment information on each piece of electrical equipment that it has obtained.

Based on the operating state and the environmental condition outputted from the equipment-information obtaining section 210, the actual-load calculating section 211 calculates a thermal load Q of electrical equipment. Then, the actual-load calculating section 211 outputs the thermal load Q it has calculated to the energy-saving equipment estimated power-consumption calculating section 213.

The similar-equipment selecting section 221 judges a similar type of equipment, based on the product number outputted by the equipment-information obtaining section 210, the similar type of equipment. Then, it inquires of the manufacturer's energy-saving equipment database 190 about energy-saving equipment data. Specifically, the similar-equipment selecting section 221 relates the product number and the basic performance of several pieces of electrical equipment which include energy-saving equipment, and stores them in advance. Then, it selects, from the product number of several types of electrical equipment which are stored beforehand, electrical equipment which has the same basic performance as the basic performance which corresponds to the product number outputted from the equipment-information obtaining section 210. Next, it inquires of the energy-saving equipment database 190, so that information on the selected electrical equipment can be obtained. A table data is formed by relating the product number and the basic performance of several pieces of electrical equipment and storing them in advance. It is updated every time new electrical equipment goes on the market, and thus, data on the latest model is always stored.

The simulation-data obtaining section 222 obtains energy-saving equipment data which is transmitted from the energy-saving equipment database 190. The simulation-data obtaining section 222 outputs the energy-saving equipment data which has been obtained from the energy-saving equipment database 190, to the energy-saving equipment estimated power-consumption calculating section 213. Herein, the energy-saving equipment data will be described later.

Based on the thermal load Q which is outputted from the actual-load calculating section 211 and the energy-saving equipment data which is outputted from the simulation-data obtaining section 222, the energy-saving equipment estimated power-consumption calculating section 213 calculates a power consumption which is estimated when the energy-saving equipment is used in the house 100. Then, the energy-saving equipment estimated power-consumption calculating section 213 outputs the estimated power consumption which has been calculated to the energy-saving recommended-equipment selecting section 214.

The energy-saving recommended-equipment selecting section 214 compares the estimated power consumption which has been outputted by the energy-saving equipment estimated power-consumption calculating section 213 and the actual power consumption which has been outputted from the equipment-information obtaining section 210. Then, it selects, as energy-saving recommended equipment, electrical equipment whose estimated power consumption is less than the power consumption which has been actually consumed in the house 100. Next, the energy-saving recommended-equipment selecting section 214 outputs information on the energy-saving recommended equipment it has selected, to the energy-saving recommended-equipment information transmitting section 202.

The energy-saving recommended-equipment information transmitting section 202 transmits, to the display unit 130, energy-saving recommended-equipment information on the energy-saving recommended equipment which has been selected by the energy-saving recommended-equipment selecting section 214. Then, the display unit 130 receives the energy-saving recommended-equipment information which has been transmitted by the energy-saving recommended-equipment information transmitting section 202, and displays the energy-saving recommended-equipment information it has received.

Herein, the equipment adapter 110 adds, to the equipment information, identification information which is used to identify electrical equipment in each house, and then, it transmits it to the equipment-information obtaining section 210. This allows the data center 170 to identify electrical equipment in several houses, thus accurately transmitting the created energy-saving recommended-equipment information to the display unit in each house.

According to this embodiment, the equipment adapters 110 to 114 corresponds to an example of the equipment-information obtaining means and the equipment-information obtaining unit; the energy-saving equipment databases 190, 191 corresponds to an example of the energy-saving equipment-information storing means and the energy-saving equipment-information storage unit; the data center 170 corresponds to an example of the energy-saving recommended-equipment information creating means, the energy-saving recommended-equipment information creation unit and the unit for providing information on energy-saving recommended equipment; the display unit 130 corresponds to an example of the displaying means and the display unit; the energy-saving equipment estimated power-consumption arithmetically-operating section 201 corresponds to an example of the estimated energy-quantity arithmetically-operating means; the energy-saving equipment-data obtaining section 203 corresponds to an example of the energy-saving equipment-information obtaining means; and the energy-saving equipment estimated power-consumption calculating section 213 corresponds to an example of the estimated energy-quantity calculating means.

Next, a detailed operation according to the present invention will be described in the case of equipment information on the air conditioner 180. First, the equipment-information obtaining section 210 of the energy-saving equipment estimated power-consumption arithmetically-operating section 201 obtains equipment information on the air conditioner 180. Then, it sends its product number (which corresponds to YYYY28 in FIG. 3A) to the energy-saving equipment-data obtaining section 203, and sends, to the actual-load calculating section 211, an operating state (which corresponds, in FIG. 3A, to a power ON/OFF state, an operation mode, a set temperature and an air-flow rate) and an environmental condition (which corresponds, in FIG. 3A, to a sucked-air temperature, a blown-air temperature and an outdoor temperature). Then, the actual-load calculating section 211 calculates a yearly thermal load Q (kcal/year) on the air conditioner 180 used in a house, using the following expression (1).

$$Q(\text{kcal/year})=V(\text{kg/year})\times Cp(\text{kcal/kg}\cdot^{\circ}\text{ C.})\times\Delta t(^{\circ}\text{ C.}) \qquad (1)$$

Herein, V represents a flow rate at which air passed through an indoor unit of the air conditioner 180 during the period of one year; Δt, the difference in temperature between the air before and the air after it passed; and Cp, the specific heat of air. Herein, Cp is a constant. From among the operating states of the air conditioner 180, the flow rate V can be calculated using the history of the power ON/OFF and air-flow rate during the period of one year. From among the environmental conditions of the air conditioner 180, Δt can be calculated using the difference in temperature between the sucked air and the blown air. Herein, unless the sucked-air temperature is obtained, the set temperature among the operating states of the air conditioner 180 can be used instead. In short, using the equipment information, the actual-load calculating section 211 can calculate an actual yearly thermal load Q on the air conditioner 180 used in a house. Then, the thermal load Q calculated by the actual-load calculating section 211 is sent to the energy-saving equipment estimated power-consumption calculating section 213. In addition, if the history of the flow rate V is shorter than a year, the actual-load calculating the sucked-air temperature is obtained, the set temperature section 211 estimates a flow rate per year, and using the estimated flow rate V, it calculates the thermal load Q. For example, if there is only its one-month history, the actual-load calculating section 211 increases a flow rate per month by twelve, so that the flow rate V for one year can be obtained.

On the other hand, the product number which has been sent to the energy-saving equipment-data obtaining section 203 from the equipment-information obtaining section 210 is sent to the similar-equipment selecting section 221. Then, the similar-equipment selecting section 221 judges a similar type of equipment from the sent product number, and inquires of the manufacturers' energy-saving equipment databases 190, 191 about energy-saving equipment data. The manufacturer's energy-saving equipment database 190 has, for example, such a configuration as shown in FIG. 5. The energy-saving equipment database 190 is configured by, for example, data on the power consumption of the newest energy-saving type of air conditioner, TV set and lighting apparatus. Herein, the data on the power consumption represents, in the case of an air conditioner, the size of a room where it is used, its capacity, product number, price, COP (or coefficient of performance) at the time of cooling and heating operations, or the like. With respect to a TV set, it represents its screen size, product number, price, rated power consumption (at the time when it is in operation or on standby), or the like. In a lighting apparatus, it represents the size of a room where it is used, its product number, price, rated power consumption, or the like.

If the product number of an air conditioner which has been sent from the energy-saving equipment estimated power-consumption arithmetically-operating section 201 is, for example, YYYY28, then the similar-equipment selecting section 221 can judge from the product number that the air conditioner has a cooling capacity of 2.8 kW. Therefore, inquiring a similar model is equivalent to inquiring an energy-saving type of air conditioner which has the same cooling capacity of 2.8 kW. The simulation-data obtaining section 222 obtains energy-saving equipment data which has been sent as a result of the inquiry. Then, it sends a simulation parameter necessary for a simulation to the energy-saving equipment estimated power-consumption calculating section 213. As shown in FIG. 5, according to this embodiment, a COP or the like which corresponds to the product numbers AAAA28, BBBB28 and CCCC28 of air conditioners which have a cooling capacity of 2.8 kW is sent as the energy-saving equipment data.

If the electrical equipment which is domestically used is replaced with energy-saving equipment, and the energy-saving equipment is used in the house 100, then using the simulation parameter obtained from the simulation-data obtaining section 222 and the yearly thermal load Q (kcal/year) which has been calculated and sent by the actual-load calculating section 211, the energy-saving equipment estimated power-consumption calculating section 213 simulates its power consumption and calculates an estimated power consumption W of the energy-saving equipment. In this way, using an ordinal simulation, the energy-saving equipment estimated power-consumption calculating section 213 can calculate the estimated power consumption W when a replacement is made with the energy-saving equipment, based on the yearly thermal load Q (kcal/year) and the COP at the time of cooling and heating. Besides, using the outside-air temperature around an outdoor unit which is obtained by the equipment adapter for an air conditioner, it can calculate more precisely the estimated power consumption W. Hence, the energy-saving equipment estimated power-consumption arithmetically-operating section 201 calculates the estimated power consumption W, based on the conditions in which an air conditioner was actually used in each house, in other words, its operating state such as time and operation mode, or environmental condition such as sucked-air and blown-air temperatures, and outside-air temperature. This can let a resident know that the power consumption estimated when a replacement is made with an energy-saving type of air conditioner is equivalent to this estimated power consumption W.

Herein, according to this embodiment, the similar-equipment selecting section 221 selects several energy-saving types of air conditioners. Therefore, the estimated power consumption W is calculated for each product number. In the case of a TV set or a lighting apparatus, on the other hand, the energy-saving equipment estimated power-consumption calculating section 213 executes a simulation, based on an operating state (especially of power ON/OFF) of the equipment information and the rated power consumption of energy-saving equipment from the energy-saving equipment-data obtaining section 203. In other words, as long as the hours for which it was used are obtained, the energy-saving equipment estimated power-consumption calculating section 213 can calculate the estimated power consumption W, using the rated power consumption.

The energy-saving recommended-equipment selecting section 214 selects, as energy-saving recommended equipment, electrical equipment which has an estimated power consumption W that is less than the power consumption of the air conditioner actually used by a person who lives in a house. Herein, the power consumption W is estimated when a replacement is made with an energy-saving type of air conditioner. As described above, it is calculated by the energy-saving equipment estimated power-consumption arithmetically-operating section 201. Then, the energy-saving recommended-equipment selecting section 214 transmits, to the energy-saving recommended-equipment information transmitting section 202, its product number and estimated power consumption, in addition to the power consumption of the air conditioner actually used by the person. Next, the energy-saving recommended-equipment information transmitting section 202 creates information on the energy-saving recommended equipment, as well as the price of the energy-saving equipment data. Therefore, the energy-saving recommended-equipment information includes the product number, price and estimated power consumption of the air conditioner which always helps conserve energy if the air conditioner actually used by a resident is replaced with it. It also includes the power consumption of the air conditioner which is used by the resident. Herein, in a TV set and a lighting apparatus, the energy-saving recommended-equipment selecting section 214 and the energy-saving recommended-equipment information transmitting section 202 execute processing in the same process as that of an air conditioner. This is because they are simply different in equipment from an air conditioner. The energy-saving recommended-equipment information which has been created by the data center 170 as described above is sent to the display unit 130 of the house 100 over the network 160.

In the case of an electric hot-water supplying apparatus, if the equipment-information obtaining section 210 obtains equipment information on the electric hot-water supplying apparatus, it sends its product number (which corresponds to WWWW in FIG. 4) to the energy-saving equipment-data obtaining section 203, and sends, to the actual-load calculating section 211, a stored hot-water temperature, a publicly-circulating water temperature and a used-water flow rate. Then, the actual-load calculating section 211 calculates a yearly thermal load Q (kcal/year) which has been consumed by the electric hot-water supplying apparatus, using the following expression (2).

$$Q(\text{kcal/year})=Q\text{use}(\text{m}^3/\text{year})\times(T\text{tank}(^\circ\text{ C.})-T\text{in}(^\circ\text{ C.}))\times C(\text{kcal}\cdot^\circ\text{ C.})\times D(\text{kg/m}^3) \quad (2)$$

Herein, Quse represents a used-water flow rate during the period of one year; Ttank, a stored hot-water temperature; Tin, a publicly-circulating water temperature; C, the specific heat of water; and D, the density of water. Then, the thermal load Q calculated by the actual-load calculating section 211 is sent to the energy-saving equipment estimated power-consumption calculating section 213.

In the case of a gas hot-water supplying apparatus, Ttank in the following expression (2) is substituted with a supplied hot-water temperature, so that the thermal load Q can be calculated in the same way.

Hence, with respect to the hot-water supplying apparatus 184 whose energy source is electricity or gas, in the same process as an air conditioner, an estimated power consumption or an estimated gas consumption can be calculated using energy-saving equipment data. Thus, the energy-saving recommended-equipment information transmitting section 202 can create information on the energy-saving recommended equipment, as well as the price of the energy-saving equipment data.

Figure 6:
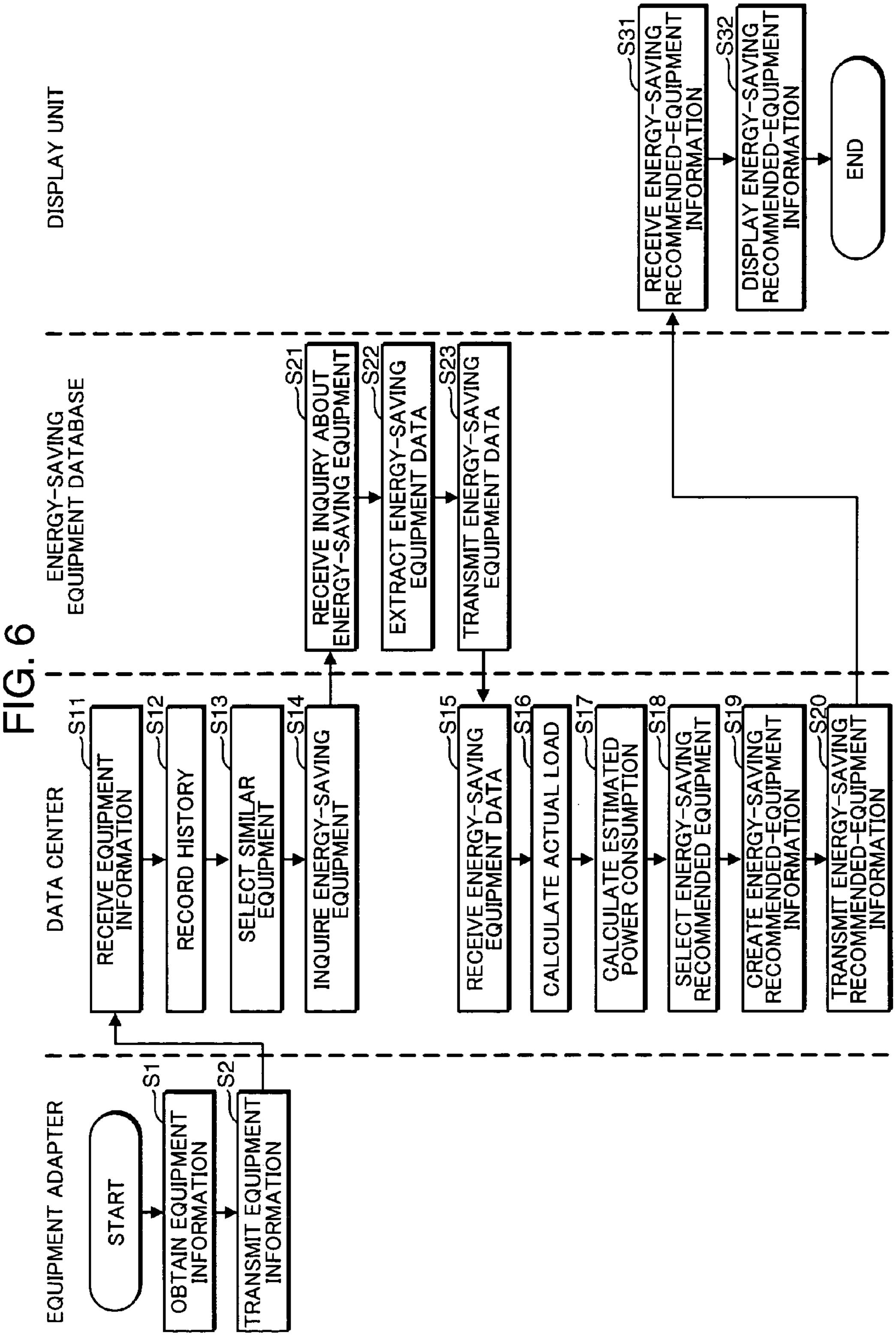
FIG. 6 is a flow chart, showing an operation of the energy management system shown in FIG. 4.

FIG. 6 is a flow chart, showing an operation of the energy management system shown in FIG. 4.

First, in a step S1, the equipment adapter 110 obtains equipment information from electrical equipment. Next, in a step S2, the equipment adapter 110 transmits the equipment information obtained from electrical equipment to the data center 170.

Next, in a step S11, the data center 170 receives the equipment information transmitted from the equipment adapter 110. Next, in a step S12, the data center 170 stores the received equipment information as a history. Next, in a step S13, based on the product number of electrical equipment included in the equipment information, the data center 170 selects energy-saving equipment which has the same level of basic performance as the electrical equipment.

Next, in a step S14, the data center 170 inquires of the energy-saving equipment database 190 about the energy-saving equipment it has selected. Herein, the energy-saving equipment database is provided by each manufacturer which sells electrical equipment. If there are the energy-saving equipment databases of several manufacturers on a network, the data center 170 inquires of all the energy-saving equipment databases.

Next, in a step S21, the energy-saving equipment database 190 receives the inquiry about the energy-saving equipment transmitted from the data center 170. Next, in a step S22, the energy-saving equipment database 190 extracts energy-saving equipment data. The energy-saving equipment database 190 extracts the energy-saving equipment data which includes the stored price and COP that correspond to the product number of the energy-saving equipment. Next, in a step S23, the energy-saving equipment database 190 transmits the energy-saving equipment data it has extracted to the data center 170.

Next, in a step S15, the data center 170 receives the energy-saving equipment data transmitted from the energy-saving equipment database 190. Next, in a step S16, based on the operating-state information and environmental-condition information on the electrical equipment which are included in the obtained equipment information, the data center 170 calculates an actual thermal load of the electrical equipment. For example, if the electrical equipment is an air conditioner, the quantity of the air which passed through an indoor unit of the air conditioner during the period of one year is multiplied by the specific heat of the air. Then, it is multiplied by the difference in temperature between the air before and the air after it passed through the indoor unit. As a result, the thermal load can be calculated.

Next, in a step S17, the data center 170 calculates an estimated power consumption of the energy-saving equipment, using the thermal load it has calculated and the COP of the electrical equipment included in the energy-saving equipment data. In other words, the data center 170 calculates the estimated power consumption by simulating a power consumption in the case where the energy-saving equipment is used at the thermal load of the electrical equipment which is currently used in a house.

Next, in a step S18, the data center 170 compares the estimated power consumption it has calculated and the power consumption of the electrical equipment which is actually used by a person who lives in a house. Then, it selects, as energy-saving recommended equipment, energy-saving equipment whose estimated power consumption is less than the actual power consumption.

Next, in a step S19, the data center 170 creates, as energy-saving recommended-equipment information, the product number, price and estimated power consumption of the energy-saving recommended equipment it has selected, and the power consumption of the electrical equipment which is currently used. Next, in a step S20, the data center 170 transmits the energy-saving recommended-equipment information it has created to the display unit 130.

Next, in a step S31, the display unit 130 receives the energy-saving recommended-equipment information which has been transmitted from the data center 170. Next, in a step S32, the display unit 130 displays, on its display screen, the energy-saving recommended-equipment information it has received. At this time, on the display screen of the display unit 130, the product number of the electrical equipment which is currently used in a house, the hours for which it was used during the period of one year and the yearly power consumption are displayed. In addition, the product number of the energy-saving recommended equipment, the estimated yearly power consumption and the price are displayed.

FIG. 7 is a table which is displayed as an example by the display unit 130. As shown in FIG. 7, on the display screen of the display unit 130, there are displayed the name of electrical equipment, the product number, operating hours during a certain period of time and yearly power consumption of electrical equipment which is currently used, the manufacturer name, product number, estimated power consumption and price of energy-saving equipment, and the yearly-saved power consumption, yearly-saved amount of money and initial-cost covering years in the case where the electrical equipment which is currently used is replaced with the energy-saving equipment. With respect to an air conditioner which is actually used in the house 100, as "equipment in house", there are displayed, for example, YYYY28 in the column of a product number, 1560 hours/year in operating hours (usage record), and 1561 kWh/year in a total power consumption. Such information can also include energy-saving recommended-equipment information which is sent from the data center 170. In addition, it can also be directly obtained over a network from the equipment adapter 110 used for an air conditioner. As the energy-saving recommended-equipment information which is sent from the data center 170, there are displayed the product number, estimated power consumption and price of "recommended equipment". The product number of an air conditioner which is currently used is YYYY28, and thus, you can see that the air conditioner is equipment which has a cooling capacity of 2.8 kW. Then, three models are selected from the manufacturers A, B, respectively, and an estimated power consumption is displayed for each product number. Besides, a "estimated saved energy" is presented, so that a person who lives in a house can easily see advantages which are obtained when the person buys "recommended equipment" for a replacement. Specifically, the difference between the total power consumption of "equipment in house" and the estimated power consumption of "recommended equipment" is calculated for each product number as the yearly-saved power consumption. Then, the value obtained by converting it into an amount of money is calculated for each product number as the yearly-saved amount of money. Next, the years which are taken to cover the price of recommended equipment with the yearly-saved amount of money is calculated for each product number. Then, the yearly-saved power consumption, the yearly-saved amount of money and the initial-cost covering years (repayment years) which have been calculated for each product number are displayed. Such a display helps a resident become aware that, for example, if the resident replaces the present air conditioner with a product number AAAA28 of the manufacturer A, then taking the resident's usage record into account, its power consumption is expected to be 906 kWh per year. As a result, compared with the currently-used air conditioner, the yearly-saved power consumption will be 655 kWh per year, and thus, the yearly-saved amount of money is expected to be 15,720 yen per year. Considering its price is 82,000 yen, the initial cost is expected to be compensated in 5.2 years. In addition, a comparison between one product number and another product number, or between one manufacturer and another manufacturer, can also be made. For example, the initial cost of a product number CCCC28 of the manufacturer A is 70,000 yen and lower than any other one. However, in consideration of its energy-saving performance, the cost is covered in 6.3 years, which is longer by 1.1 years than the product number AAAA28. This allows the resident to select out of more various products. Accordingly, if such a display is used, then different from merely a standard energy-saving effect in a catalog, specific advantages in a house can be presented, thus promoting the purchase of energy-saving equipment.

As described above, by the equipment adapter 110, equipment information is obtained on the usage record of equipment which is domestically used. In the energy-saving equipment database 190, there is stored energy-saving equipment data on the performance of a plurality of pieces of energy-saving equipment whose energy consumption is more efficient than the equipment which is domestically used. By the data center 170, energy-saving equipment data is obtained from the energy-saving equipment database 190. Then, based on the obtained energy-saving equipment data and the obtained equipment information, from among the plurality of pieces of energy-saving equipment, energy-saving equipment according to how the equipment has been domestically used is selected as energy-saving recommended equipment. Next, energy-saving recommended-equipment information on the selected energy-saving recommended equipment is created. Then, by the display unit 130, the created energy-saving recommended-equipment information is displayed.

Therefore, electrical equipment which has a higher energy-consumption efficiency than that of electrical equipment which is used in a house and corresponds to how the electrical equipment which is used in a house has been used, is selected as energy-saving recommended equipment. Then, energy-saving recommended-equipment information on the selected energy-saving recommended equipment is presented to a user. This prompts a person who lives in a house to purchase new electrical equipment and replace the electrical equipment which is used by the person. Accordingly, the person can buy electrical equipment whose energy efficiency is higher than that of the electrical equipment which is domestically used, thereby realizing energy conservation.

Furthermore, the equipment adapter 110, the data center 170, the energy-saving equipment database 190 and the display unit 130 are connected over a network. By the equipment adapter 110, equipment information on how electrical equipment has been used is obtained, and the obtained equipment information is transmitted to the data center 170. Then, by the data center 170, energy-saving equipment information is obtained over the network from the energy-saving equipment database 190, and the equipment information transmitted by the equipment adapter 110 is received. Then, based on the obtained energy-saving equipment information and the received equipment information, from among a plurality of pieces of energy-saving equipment, energy-saving equipment according to how the equipment has been used is selected as energy-saving recommended equipment. Next, energy-saving recommended-equipment information on the selected energy-saving recommended equipment is created, and the created energy-saving recommended-equipment information is transmitted to the display unit 130. Then, by the display unit 130, the energy-saving recommended-equipment information which has been transmitted by the data center 170 is received, and the received energy-saving recommended-equipment information is displayed. Therefore, if new energy-saving equipment is sold, then information can be swiftly updated, thus facilitating the update of new information.

In addition, by the equipment adapter 110, equipment information which further includes the power consumption in a house by electrical equipment is obtained. Then, by the energy-saving equipment-data obtaining section 203, energy-saving equipment data on energy-saving equipment whose performance is as good as that of electrical equipment which is used in a house at present is obtained from the energy-saving equipment database. Next, by the energy-saving equipment estimated power-consumption arithmetically-operating section 201, based on the obtained energy-saving equipment data and equipment information, the power consumption estimated when the electrical equipment which is used in a house is replaced with the energy-saving equipment is calculated. Then, by the energy-saving recommended-equipment selecting section 214, the calculated estimated power consumption and the power consumption included in the obtained equipment information are compared. Next, energy-saving equipment which has the estimated power consumption less than the power consumption is selected as energy-saving recommended equipment.

Therefore, when energy-saving equipment whose performance is as good as that of electrical equipment which is used in a house at present is used in the house, its estimated power consumption is calculated. Then, energy-saving equipment which has the calculated estimated power consumption less than the actual power consumption is selected as energy-saving recommended equipment. Therefore, energy-saving equipment whose energy efficiency is higher than that of the electrical equipment which is currently used can be selected. Hence, when electrical equipment which has a performance as good as that of electrical equipment which is used at present by a user is purchased to replace the existing equipment, its power consumption can be estimated according to how the existing electrical equipment has been used in each house.

Furthermore, in the energy-saving recommended-equipment information, there are included the product number and price of the energy-saving equipment, and the power consumption estimated when a replacement is made with the energy-saving equipment. Then, by the display unit 130, the product number and the price of the energy-saving recommended equipment are displayed, and the estimated power consumption and the power consumption included in the equipment information are compared and displayed. Therefore, a user can compare the power consumption estimated when a replacement is made with the energy-saving equipment and the power consumption of electrical equipment which is domestically used. This allows the user to become aware how much electricity can be saved if electrical equipment which is presently used is replaced with energy-saving equipment.

Moreover, in the equipment information, there are included the product number of electrical equipment which is currently used, its operating state including an operating time and an operation mode, an environmental condition including the temperature around the electrical equipment and an outside-air temperature, and the power consumption of the electrical equipment. Accordingly, energy-saving equipment data can be obtained, using the product number of the electrical equipment which is currently used. Then, using an operating state including the operating time and operation mode of the electrical equipment which is currently used, and an environmental condition including the temperature around the electrical equipment which is currently used and an outside-air temperature, the power consumption which is estimated when the electrical equipment which is currently used is replaced with energy-saving equipment can be calculated. Thus, using the power consumption of the electrical equipment which is currently used, energy-saving equipment whose energy efficiency is higher than that of the electrical equipment which is currently used can be selected.

In addition, by the equipment-information obtaining section 210, at least either of operating-state information including the operating time and operation mode of the electrical equipment, and environmental-condition information including the temperature around the electrical equipment and the outside-air temperature, the product number of the electrical equipment, and the power consumption of the electrical equipment are obtained as the equipment information. Then, by the energy-saving equipment-data obtaining section 203, the product number, price and energy-consumption efficiency of the energy-saving equipment are obtained. Next, by the actual-load calculating section 211, an actual thermal load of the electrical equipment is calculated based on at least either of the operating-state information and the environmental-condition information which have been obtained. Then, by the energy-saving equipment estimated power-consumption calculating section 213, the power consumption which is estimated when the energy-saving equipment which has the obtained energy-consumption efficiency is used at the calculated thermal load is calculated. Next, by the energy-saving recommended-equipment selecting section 214, the estimated power consumption which has been calculated and the power consumption which is included in the obtained equipment information are compared, then energy-saving equipment which has the estimated power consumption that is less than the power consumption is selected as energy-saving recommended equipment, and energy-saving recommended-equipment information which includes the product number of the obtained electrical equipment, the product number and price of the energy-saving equipment which are included in the obtained energy-saving equipment data, the estimated power consumption which has been calculated, and the power consumption which is included in the obtained equipment information, are created.

Accordingly, an actual thermal load of the equipment is calculated based on at least either of an operating state including the operating time and operation mode, and an environmental condition including the temperature around the electrical equipment and the outside-air temperature. Then, the power consumption which is estimated when the energy-saving equipment which has the obtained energy-consumption efficiency is used at the calculated thermal load is calculated. Therefore, the power consumption which is estimated when the electrical equipment which is domestically used is replaced with the energy-saving equipment can be calculated. This allows you to precisely simulate, according to how the electrical equipment has been used, the power consumption at the time when it is replaced with the energy-saving equipment.

Herein, according to this embodiment, a power consumption is presented on a scale of one year. However, it can also be given on a monthly basis, or during a cooling operation or a heating operation.

Figure 8:
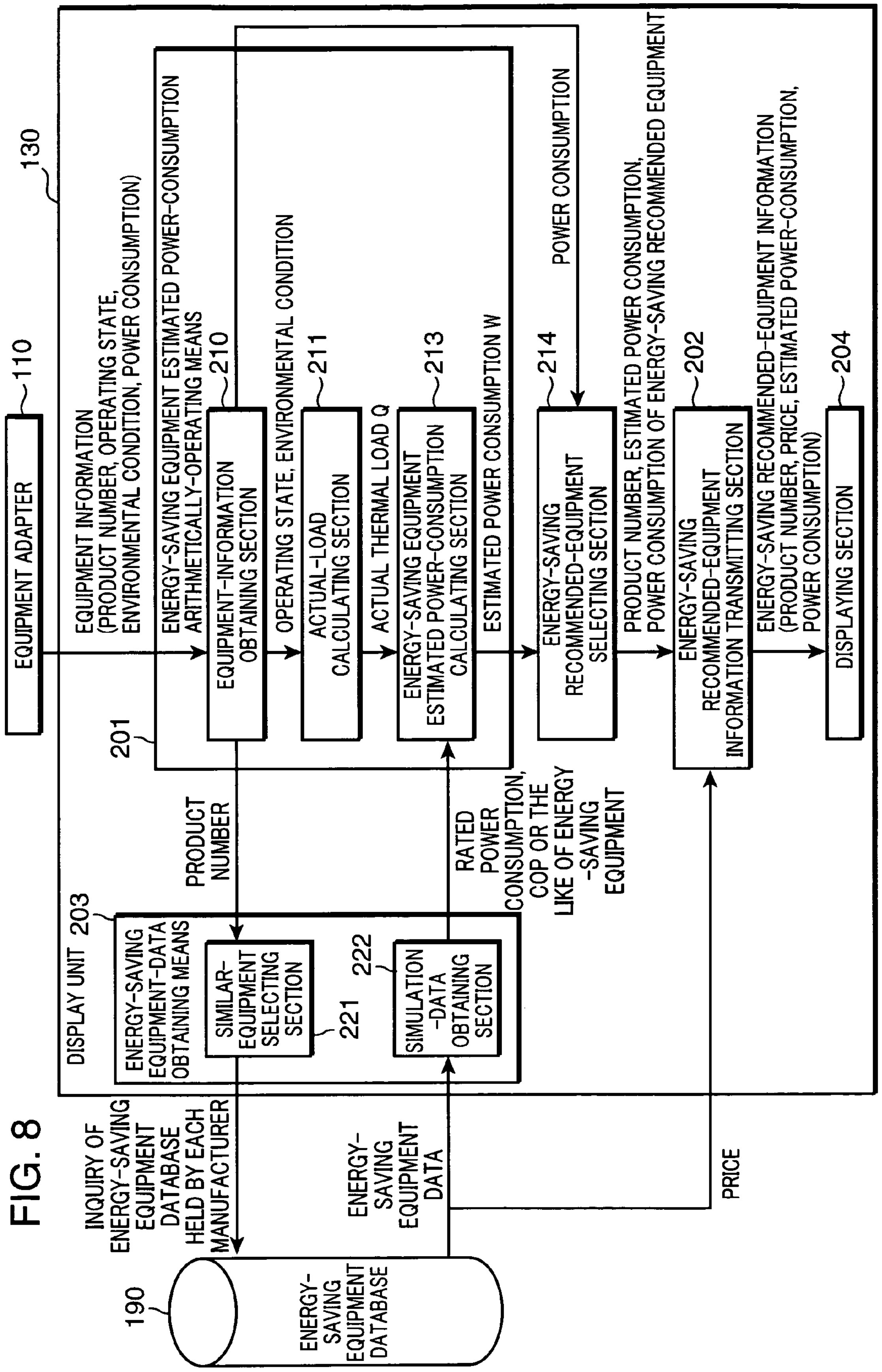
FIG. 8 is a block diagram, showing the configuration of an energy management system according to a variation of this embodiment.

Furthermore, the function of the data center 170 according to this embodiment may also be provided in the display unit 130. FIG. 8 is a block diagram, showing the configuration of an energy management system according to a variation of this embodiment. The energy management system shown in FIG. 8 includes the equipment adapter 110, the display unit 130 and the energy-saving equipment database 190. They are connected to each other over a network. The display unit 130 is configured by: an energy-saving equipment estimated power-consumption arithmetically-operating section 201 which obtains equipment information and calculates a power consumption estimated when a replacement is made with energy-saving equipment; an energy-saving equipment-data obtaining section 203 which inquires of the manufacturer's energy-saving equipment database 190, obtains energy-saving equipment data and provides it to the energy-saving equipment estimated power-consumption arithmetically-operating section 201; an energy-saving recommended-equipment selecting section 214 which selects energy-saving recommended equipment; an energy-saving recommended-equipment information transmitting section 202 which transmits energy-saving recommended-equipment information to the display unit 130; and a displaying section 204 which displays the energy-saving recommended-equipment information transmitted by the energy-saving recommended-equipment information transmitting section 202. Herein, the configuration and operation of the energy management system shown in FIG. 8 are the same as those of the energy management system shown in FIG. 8, and thus, their description is omitted.

Moreover, the functions of the data center 170 and the energy-saving equipment database 190 according to this embodiment may also be provided in the display unit 130. In that case, the equipment adapter 110 and the display unit 130 are connected over an indoor network. Then, energy-saving equipment data which is stored in the energy-saving equipment database 190 is provided, using a computer-readable recording medium such as a CD-ROM.

In addition, a gateway which connects an indoor communication line in the house 100 and the outdoor network 160 may also have the function of the data center 170. If a control unit which controls each piece of electrical equipment is provided, the control unit may also have the function of the data center 170.

Furthermore, according to this embodiment, by the energy-saving equipment-data obtaining section 203, energy-saving equipment whose basic performance is on the same level as that of electrical equipment which is used in a house is selected. Then, energy-saving equipment data on the selected energy-saving equipment is obtained. However, even if certain electrical equipment has a different basic performance, that electrical equipment may have a higher energy-consumption efficiency. For example, in the case where an air conditioner which is used at present by a user has a cooling capacity of 2.5 kW, if the user replaces it with an air conditioner which has a cooling capacity of 2.8 kW, its energy-consumption efficiency can become higher. Hence, the energy-saving equipment-data obtaining section 203 according to this embodiment may also select electrical equipment of the same type as electrical equipment which is used in a house. In that case, energy-saving equipment data on the selected energy-saving equipment is obtained.

In the above described case, by the equipment-information obtaining section 210, equipment information which further includes the power consumption in a house by electrical equipment is obtained. Then, by the energy-saving equipment-data obtaining section 203, energy-saving equipment data on energy-saving equipment of the same type as electrical equipment which is used in a house at present is obtained from the energy-saving equipment database 190. Next, by the energy-saving equipment estimated power-consumption arithmetically-operating section 201, based on the obtained energy-saving equipment data and equipment information, the power consumption estimated when the electrical equipment which is used in a house is replaced with the energy-saving equipment is calculated. Then, by the energy-saving recommended-equipment selecting section 214, the estimated power consumption which has been calculated and the power consumption which is included in the obtained equipment information are compared. Next, energy-saving equipment which has the estimated power consumption which is less than the power consumption is selected as energy-saving recommended equipment.

Therefore, when energy-saving equipment of the same type as electrical equipment which is used in a house at present is used in the house, its estimated power consumption is calculated. Then, energy-saving equipment which has the calculated estimated power consumption less than the actual power consumption is selected as energy-saving recommended equipment. Therefore, energy-saving equipment whose energy efficiency is higher than that of the electrical equipment which is currently used can be selected. Hence, when electrical equipment is purchased to replace the existing equipment, its power consumption can be estimated according to how the existing electrical equipment has been used in each house. Besides, a plurality of pieces of energy-saving equipment whose energy-consumption efficiency is higher than that of the electrical equipment which is currently used is presented to a user. This allows the user to select out of more various products.

Herein, the means which have been described according to this embodiment may also be implemented in the form of a program which allows hardware resources to collaborate. Herein, the hardware resources are electrical/information equipment, a computer, a server, and the like which includes a CPU (or a microcomputer), a RAM, a ROM, a storage/recording unit, an I/O, or the like. If they are implemented in the form of a program, then a recording can be made in a recording medium such as a magnetic medium and an optical medium, or a distribution can be conducted using a communication line such as the Internet. This facilitates the distribution or updating of a new function and its installation.

The energy management system according to the present invention is capable to prompting a person who lives in a house to replace electrical equipment which is used by the person with new such equipment, and thus, realizing energy conservation. In short, the energy management system or the like is useful in promoting the energy saving of equipment which is used in each house.

This application is based on Japanese patent application serial No. 2003-176460, filed in Japan Patent Office on Jun. 20, 2003, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An energy management system, comprising:

an equipment-information obtaining means for obtaining equipment information on how equipment has been used;

an energy-saving equipment-information storing means for storing energy-saving equipment information on the performance of a plurality of pieces of energy-saving equipment whose energy consumption is more efficient than that of the equipment;

an energy-saving recommended-equipment information creating means for obtaining energy-saving equipment information from the energy-saving equipment-information storing means, then based on the obtained energy-saving equipment information and the equipment information obtained by the equipment-information obtaining means, from among the plurality of pieces of energy-saving equipment, selecting, as energy-saving recommended equipment, energy-saving equipment according to how the equipment has been used, and creating energy-saving recommended-equipment information on the selected energy-saving recommended equipment; and a displaying means for displaying the energy-saving recommended-equipment information created by the energy-saving recommended-equipment information creating means.

2. The energy management system according to claim 1, wherein:

the equipment-information obtaining means, the energy-saving recommended-equipment information creating means, the energy-saving equipment-information storing means and the displaying means are connected over a network;

the equipment-information obtaining means obtains equipment information on how equipment has been used, and transmits the obtained equipment information to the energy-saving recommended-equipment information creating means;

the energy-saving recommended-equipment information creating means obtains energy-saving equipment information from the energy-saving equipment-information storing means, then based on the obtained energy-saving equipment information and the equipment information transmitted by the equipment-information obtaining means, from among the plurality of pieces of energy-saving equipment, selects, as energy-saving recommended equipment, energy-saving equipment according to how the equipment has been used, then creates energy-saving recommended-equipment information on the selected energy-saving recommended equipment, and transmits the created energy-saving recommended-equipment information to the displaying means; and the displaying means displays the energy-saving recommended-equipment information which is transmitted by the energy-saving recommended-equipment information creating means.

3. The energy management system according to claim 1, wherein:

the equipment-information obtaining means obtains, as the equipment information, consumed energy-quantity information which is used to specify the quantity of energy consumed when the equipment is used in a house; and the energy-saving recommended-equipment information creating means includes, an energy-saving equipment-information obtaining means for obtaining, from the energy-saving equipment-information storing means, energy-saving equipment information on the same type of energy-saving equipment as equipment which is used in a house at present, an estimated energy-quantity arithmetically-operating means for calculating, based on the energy-saving equipment information obtained by the energy-saving equipment-information obtaining means and the equipment information, the quantity of energy estimated when the equipment which is used in a house is replaced with the energy-saving equipment, and an energy-saving recommended-equipment selecting means for comparing the estimated energy quantity calculated by the estimated energy-quantity arithmetically-operating means and the consumed energy quantity obtained by the equipment-information obtaining means, and selecting, as energy-saving recommended equipment, energy-saving equipment which has the estimated energy quantity smaller than the consumed energy quantity.

4. The energy management system according to claim 1, wherein:

the equipment-information obtaining means obtains, as the equipment information, consumed energy-quantity information which is used to specify the quantity of energy consumed when the equipment is used in a house; and the energy-saving recommended-equipment information creating means includes, an energy-saving equipment-information obtaining means for obtaining, from the energy-saving equipment-information storing means, energy-saving equipment information on energy-saving equipment whose performance is as good as that of equipment which is used in a house at present, an estimated energy-quantity arithmetically-operating means for calculating, based on the energy-saving equipment information obtained by the energy-saving equipment-information obtaining means and the equipment information, the quantity of energy estimated when the equipment which is used in a house is replaced with the energy-saving equipment, and an energy-saving recommended-equipment selecting means for comparing the estimated energy quantity calculated by the estimated energy-quantity arithmetically-operating means and the consumed energy quantity obtained by the equipment-information obtaining means, and selecting, as energy-saving recommended equipment, energy-saving equipment which has the estimated energy quantity smaller than the consumed energy quantity.

5. The energy management system according to claim 3, wherein:

the energy-saving recommended-equipment information includes the product number and price of the energy-saving equipment, and the quantity of energy estimated when a replacement is made with the energy-saving equipment; and the displaying means displays the product number and the price of the energy-saving recommended equipment, and compares and displays the estimated energy quantity and the consumed energy quantity obtained by the equipment-information obtaining means.

6. The energy management system according to claim 4, wherein:

the energy-saving recommended-equipment information includes the product number and price of the energy-saving equipment, and the quantity of energy estimated when a replacement is made with the energy-saving equipment; and the displaying means displays the product number and the price of the energy-saving recommended equipment, and compares and displays the estimated energy quantity and the consumed energy quantity obtained by the equipment-information obtaining means.

7. The energy management system according to claim 3, wherein:

the equipment-information obtaining means obtains, as the equipment information, at least either of operating-state information including the operating time and operation mode of the equipment, and environmental-condition information including the temperature around the equipment and the outside-air temperature, the product number of the equipment, and the consumed energy quantity of the equipment;

the energy-saving equipment-information obtaining means obtains the product number, price and energy-consumption efficiency of the energy-saving equipment;

the estimated energy-quantity arithmetically-operating means includes, an actual-load calculating means for calculating an actual thermal load of the equipment, based on at least either of the operating-state information and the environmental-condition information which are obtained by the equipment-information obtaining means, and an estimated energy-quantity calculating means for calculating the quantity of energy estimated when the energy-saving equipment which has the energy-consumption efficiency obtained by the energy-saving equipment-information obtaining means is used at the thermal load calculated by the actual-load calculating means; and the energy-saving recommended-equipment selecting means compares the estimated energy quantity calculated by the estimated energy-quantity calculating means and the consumed energy quantity obtained by the equipment-information obtaining means, then selects, as energy-saving recommended equipment, energy-saving equipment which has the estimated energy quantity smaller than the consumed energy quantity, and creates energy-saving recommended-equipment information which includes the product number of the equipment obtained by the equipment-information obtaining means, the product number and price of the energy-saving equipment which are included in the energy-saving equipment information obtained by the energy-saving equipment-information obtaining means, the estimated energy quantity calculated by the estimated energy-quantity calculating means, and the consumed energy quantity obtained by the equipment-information obtaining means.

8. The energy management system according to claim 4, wherein:

the equipment-information obtaining means obtains, as the equipment information, at least either of operating-state information including the operating time and operation mode of the equipment, and environmental-condition information including the temperature around the equipment and the outside-air temperature, the product number of the equipment, and the consumed energy quantity of the equipment;

the energy-saving equipment-information obtaining means obtains the product number, price and energy-consumption efficiency of the energy-saving equipment;

the estimated energy-quantity arithmetically-operating means includes, an actual-load calculating means for calculating an actual thermal load of the equipment, based on at least either of the operating-state information and the environmental-condition information which are obtained by the equipment-information obtaining means, and an estimated energy-quantity calculating means for calculating the quantity of energy estimated when the energy-saving equipment which has the energy-consumption efficiency obtained by the energy-saving equipment-information obtaining means is used at the thermal load calculated by the actual-load calculating means; and the energy-saving recommended-equipment selecting means compares the estimated energy quantity calculated by the estimated energy-quantity calculating means and the consumed energy quantity obtained by the equipment-information obtaining means, then selects, as energy-saving recommended equipment, energy-saving equipment which has the estimated energy quantity smaller than the consumed energy quantity, and creates energy-saving recommended-equipment information which includes the product number of the equipment obtained by the equipment-information obtaining means, the product number and price of the energy-saving equipment which are included in the energy-saving equipment information obtained by the energy-saving equipment-information obtaining means, the estimated energy quantity calculated by the estimated energy-quantity calculating means, and the consumed energy quantity obtained by the equipment-information obtaining means.

9. An energy management method, which is executed by using an equipment-information obtaining unit which obtains predetermined information from equipment, an energy-saving equipment-information storage unit which stores energy-saving equipment information on the performance of a plurality of pieces of energy-saving equipment whose energy consumption is more efficient than that of the equipment, an energy-saving recommended-equipment information creation unit which creates energy-saving recommended-equipment information on energy-saving recommended equipment whose energy consumption is more efficient than that of the equipment from among the pieces of energy-saving equipment, and a display unit which displays the energy-saving recommended-equipment information, comprising:

an equipment-information obtaining step of, by using the equipment-information obtaining unit, obtaining equipment information on how equipment which is used in a house has been used;

an energy-saving recommended-equipment information creating step of, by using the energy-saving recommended-equipment information creation unit, obtaining the energy-saving equipment information stored in the energy-saving equipment-information storage unit, then based on the obtained energy-saving equipment information and the equipment information obtained in the equipment-information obtaining step, from among the plurality of pieces of energy-saving equipment, selecting, as energy-saving recommended equipment, energy-saving equipment according to how the equipment has been used, and creating energy-saving recommended-equipment information on the selected energy-saving recommended equipment; and a displaying step of, by using the display unit, displaying the energy-saving recommended-equipment information created in the energy-saving recommended-equipment information creating step.

10. A unit for providing information on energy-saving recommended equipment, which provides, as energy-saving recommended-equipment information, information on energy-saving equipment whose energy efficiency is higher than that of equipment which is used in a house at present, comprising:

an equipment-information obtaining means for obtaining equipment information on how the equipment which is used in a house has been used;

an energy-saving equipment-information obtaining means for obtaining energy-saving equipment information from an energy-saving equipment-information storing means which stores energy-saving equipment information on the performance of a plurality of pieces of energy-saving equipment whose energy consumption is more efficient than that of the equipment;

an estimated energy-quantity arithmetically-operating means for calculating, based on the energy-saving equipment information obtained by the energy-saving equipment-information obtaining means and the equipment information obtained by the equipment-information obtaining means, the quantity of energy estimated when the equipment which is used in a house is replaced with the energy-saving equipment;

an energy-saving recommended-equipment selecting means for comparing the estimated energy quantity calculated by the estimated energy-quantity arithmetically-operating means and the consumed energy quantity obtained by the equipment-information obtaining means, and selecting, as energy-saving recommended equipment, energy-saving equipment which has the estimated energy quantity smaller than the consumed energy quantity; and a transmitting means for transmitting, to a display unit, the energy-saving recommended-equipment information on the energy-saving recommended equipment selected by the energy-saving recommended-equipment selecting means.

* * * * *